United States Patent
Soylemez et al.

(10) Patent No.: US 8,200,612 B2
(45) Date of Patent: Jun. 12, 2012

(54) EFFICIENT SQL ACCESS TO MULTIDIMENSIONAL DATA

(75) Inventors: Ekrem Soylemez, Arlington, MA (US); Caleb Welton, Malden, MA (US); Gregory Dorman, Paris (FR); Matthew Dombroski, Lancaster, MA (US); Albert A. Hopeman, IV, Arlington, MA (US); Igor Lubashev, Cambridge, MA (US); Lev Margulis, Needham, MA (US); Christopher Kearney, Chelmsford, MA (US); James Carey, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1498 days.

(21) Appl. No.: 10/841,941

(22) Filed: May 6, 2004

(65) Prior Publication Data

US 2004/0236767 A1  Nov. 25, 2004

Related U.S. Application Data

(60) Provisional application No. 60/469,032, filed on May 7, 2003.

(51) Int. Cl.
*G06F 17/30* (2006.01)
(52) U.S. Cl. .................... 707/600; 707/758; 707/774
(58) Field of Classification Search .......... 707/3, 104.1
See application file for complete search history.

(56) References Cited

U.S. PATENT DOCUMENTS

| | | | |
|---|---|---|---|
| 5,799,300 A | | 8/1998 | Agrawal et al. |
| 5,905,985 A | * | 5/1999 | Malloy et al. ................ 707/100 |
| 5,918,232 A | | 6/1999 | Pouschine et al. |
| 5,926,818 A | * | 7/1999 | Malloy ........................ 707/100 |
| 5,937,408 A | | 8/1999 | Shoup et al. |
| 5,940,818 A | * | 8/1999 | Malloy et al. ................... 707/2 |
| 5,943,668 A | * | 8/1999 | Malloy et al. ................... 707/3 |
| 5,943,677 A | | 8/1999 | Hicks |
| 5,978,796 A | * | 11/1999 | Malloy et al. ................... 707/3 |
| 6,014,614 A | | 1/2000 | Herring et al. |
| 6,108,657 A | | 8/2000 | Shoup et al. |

(Continued)

FOREIGN PATENT DOCUMENTS

WO  WO 03/012698  8/2001

OTHER PUBLICATIONS

HowTo:SQL Server 7 Distributed Query with OLAP Server, Jul. 2000 (available at http://86.83.48.191/Shared%20Documents/sql/olap/distrqry.htm) (last accessed Sep. 22, 2011).*

(Continued)

*Primary Examiner* — Christyann Pulliam
(74) *Attorney, Agent, or Firm* — Hickman Palermo Truong Becker Bingham Wong LLP

(57) ABSTRACT

In processing a query on multidimensional data in a multidimensional schema, a multidimensional database server performs various processes to limit the amount of data that is extracted from the database and presented to a relational database server in response to the request. A subset of data is identified to extract from the multidimensional data, based on the query. In various embodiments, cell-filtering, measure-filtering, and column-filtering criteria identified from the query are used to filter the subset of data, in order to return a minimized set of multidimensional data values from the subset of data. Therefore, computational resources are conserved with respect to further processing by the relational database server in response to the query.

46 Claims, 5 Drawing Sheets

U.S. PATENT DOCUMENTS

| | | | |
|---|---|---|---|
| 6,122,636 A * | 9/2000 | Malloy et al. | 707/102 |
| 6,163,774 A * | 12/2000 | Lore et al. | 705/36 R |
| 6,205,447 B1 * | 3/2001 | Malloy | 707/102 |
| 6,385,301 B1 | 5/2002 | Nolting et al. | |
| 6,385,604 B1 * | 5/2002 | Bakalash et al. | 707/3 |
| 6,421,665 B1 | 7/2002 | Brye et al. | |
| 6,480,848 B1 | 11/2002 | DeKimpe et al. | |
| 6,484,179 B1 | 11/2002 | Roccaforte | |
| 6,553,366 B1 | 4/2003 | Miller et al. | |
| 6,601,062 B1 | 7/2003 | Deshpande et al. | |
| 6,629,102 B1 | 9/2003 | Malloy et al. | |
| 6,665,682 B1 | 12/2003 | DeKimpe et al. | |
| 6,701,311 B2 | 3/2004 | Biebsheimer et al. | |
| 6,721,760 B1 * | 4/2004 | Ono et al. | 707/104.1 |
| 6,768,986 B2 * | 7/2004 | Cras et al. | 707/2 |
| 6,826,556 B1 | 11/2004 | Miller et al. | |
| 6,931,418 B1 | 8/2005 | Barnes | |
| 7,181,440 B2 * | 2/2007 | Cras et al. | 707/2 |
| 7,805,433 B2 * | 9/2010 | Dickerman et al. | 707/713 |
| 2002/0091707 A1 | 7/2002 | Keller | |
| 2002/0126545 A1 | 9/2002 | Warren et al. | |
| 2003/0084053 A1 | 5/2003 | Govrin et al. | |
| 2003/0208506 A1 | 11/2003 | Greenfield et al. | |
| 2004/0215626 A1 * | 10/2004 | Colossi et al. | 707/100 |
| 2005/0004904 A1 * | 1/2005 | Kearney et al. | 707/3 |
| 2005/0033741 A1 * | 2/2005 | Dombroski et al. | 707/3 |

OTHER PUBLICATIONS

Oracle Corporation, "Advanced Analytic Services," 1996-2001, Oracle9*i* Warehousing Guide, Release 1 (9.0.1), Part No. A90237-01, http://download-west.oracle.com/docs/cd/A91202_01/901_doc/server.901/a90237, data retrieved Aug. 6, 2004, pp. 1-5.

Oracle Corporation, "Transforming Tables into Multidimensional Data Structures," 1996-2001, Oracle9*i* OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.

Oracle Corporation, "Understanding the OLAP API," 1996-2001, Oracle9*i* OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.

Oracle Corporation, "Controlling the Flow of Execution," 1996-2001, Oracle9*i* OLAP Services Developer's Guide to the OLAP DML, Release 1 (9.0.1), Part No. A86720-01, http://download-west.oracle.com/docs/cd/A91202_01/901_doc/olap.901/a86720/, data retrieved Aug. 6, 2004, pp. 1-4.

Microsoft, HowTo:SQL Server 7 Distributed Query with OLAP Server, 2000, (available at http://86.83.48.191/Shared%20Documents/sql/olap/distqry.htm ).

Analysis Services Programming (SQL Server 2000), Passing Queries from SQL Server to a Linked Analysis Server, Microsoft MSDN, Mar. 31, 2002, 3 pgs.

Johnson Theodore, et al., "Extending Complex Ad-Hoc OLAP", CIKM, ACM, 1999, 10 pages.

* cited by examiner

DETERMINE, BY THE MULTIDIMENSIONAL SERVER AND BASED ON THE STATEMENT, A PARTICULAR RELATIONAL FORM IN WHICH TO PRESENT VALUES FROM THE SUBSET
210

DYNAMICALLY CREATE ONE OR MORE ABSTRACT DATA TYPES THAT DEFINE VALUES IN THE PARTICULAR RELATIONAL FORM
212

PRESENT THE VALUES FROM THE SUBSET IN THE PARTICULAR RELATIONAL FORM
214

EFFICIENT SQL ACCESS TO MULTIDIMENSIONAL DATA

CROSS REFERENCE TO RELATED APPLICATIONS

This application claims the benefit of priority under 35 U.S.C. §119(e) from U.S. Provisional Application Ser. No. 60/469,032 entitled "Techniques for Managing Multidimensional Data in a Relational Database Management System (RDBMS)", filed May 7, 2003, the disclosure of which is incorporated by reference in its entirety for all purposes as if fully set forth herein.

FIELD OF THE INVENTION

The present invention relates generally to database systems and, more specifically, to techniques for efficient SQL access to multidimensional data.

BACKGROUND OF THE INVENTION

In the context of database systems, a "dimension" is a list of values that provide categories for data. A dimension acts as an index for identifying values of a variable. For example, if sales data has a separate sales figure for each month, then the data has a MONTH dimension. That is, the data is organized by month. A dimension is similar to a key in a relational database. Data that is organized by two or more dimensions is referred to as "multidimensional data".

Any item of data within a multidimensional variable can be uniquely and completely selected by specifying one member from each of the variable's dimensions. For example, if a sales measure is dimensioned by MONTH, PRODUCT, and MARKET, specifying "January" for the MONTH dimension, "Stereos" for the PRODUCT dimension, and "Eastern Region" for the MARKET dimension uniquely specifies a single value of the measure. A multidimensional variable can be conceptually thought of as an N-dimensional array, where N is the number of dimensions of the variable, and where each value in the array may be accessed by specifying one dimension key value for each dimension (e.g. MDVar(dim1, dim2, dim3, . . . , dimN)). Thus, dimensions offer a concise and intuitive way of organizing and selecting data for retrieval, updating, and performing calculations.

Multidimensional arrays with 2 and 3 dimensions may be depicted visually as grids and cubes, respectively. For convenience, it has become customary to refer to the conceptual multidimensional arrays that correspond to multidimensional variables as "multidimensional cubes" (or simply "cubes") regardless of how many dimensions they possess. Hence, a multidimensional data cube is a set of n-dimensional data objects. Further, each multidimensional value, or "measure" value, is said to belong to a "cell" of the cube, where the address of the cell is the set of dimension key values (one per dimension) that correspond to the multidimensional value contained therein.

For the purpose of explanation, the multidimensional value that belongs to a cell shall be referred to as the "cell value" of that cell. Cell values are associated with types of data, i.e., measures, on which a function is executed, such as a summation function, average function, minimum value function, maximum value function, and the like. For example, a cell might contain a value representing a summation of sales in dollars for a particular product in a particular time period in a particular market, where "sales" is the measure.

Multidimensional data may be stored in relational database systems ("RDBMS") or in specialized, "multidimensional" database systems ("MDDBMS"). Multidimensional database systems provide structures and access techniques specifically designed for multidimensional data, and therefore provide relatively efficient storage and access to multidimensional data. However, when stored in specialized multidimensional database systems, only applications that are specially built to interact with those multidimensional database systems are able to access and manipulate the data.

On the other hand, when stored in relational database systems, all applications that support interaction with relational databases have access to the data. Such database applications communicate with the relational database system by submitting commands that conform to the database language supported by the relational database system, the most common of which is the ANSI Structured Query Language (SQL).

If the multidimensional data is stored in a multidimensional database, then accessing it via SQL without extracting the data and reinstating it as relational tables has traditionally been impossible. Hence, there is room for improvement in techniques for efficiently querying multidimensional data managed by a relational database management system. Specifically, there is room for improvement in techniques for accessing multidimensional data using the SQL.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
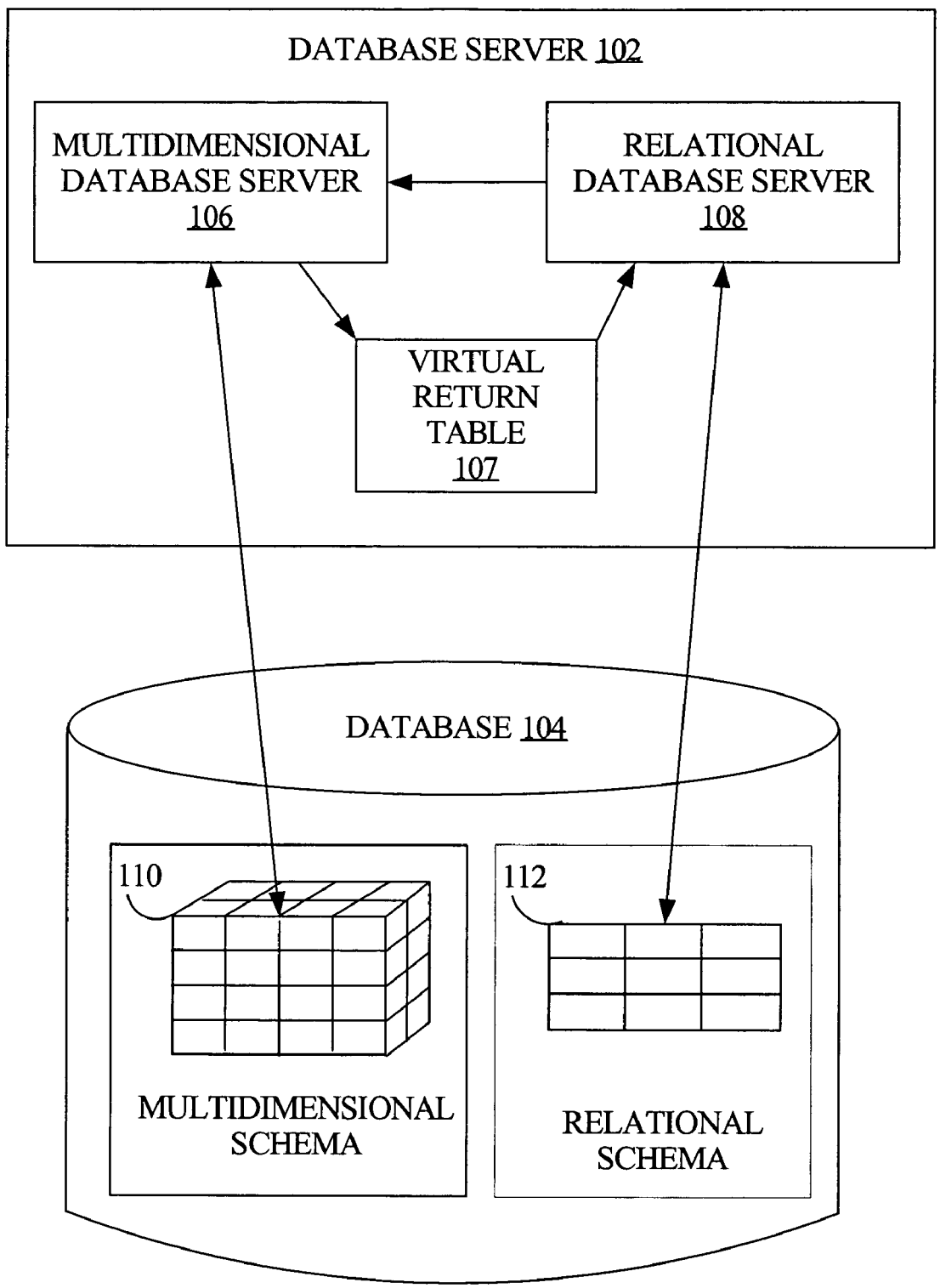
FIG. 1 is a block diagram that illustrates an operating environment in which an embodiment of the invention may be implemented.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview of Embodiments

Techniques are provided for efficiently accessing multidimensional data using relational database statements, such as SQL commands. The multidimensional data is stored according to a multidimensional schema that is accessible to a multidimensional database server. To access the data, a relational database statement is submitted to a relational database server. The relational database server communicates with the multidimensional database server to cause the multidimensional database server to extract the multidimensional data required by the relational database server to process the relational database statement. The multidimensional database server extracts the required data, and provides the data to the relational database server to enable the relational database server to finish processing the relational database statement.

According to one aspect of the invention, the multidimensional database server performs various operations to reduce the amount of data that is passed to the relational database server and/or to reduce the amount of computation required of the relational database server to process the relational database statement. As shall be described in greater detail hereafter, the operations include (a) limiting the extraction to only a subset of the multidimensional cube (i.e., n-dimensional data objects) represented in the multidimensional schema, (b) selecting only those cells within the subset that satisfy certain criteria, and (c) from the selected cells, only extracting those values that will be required by the relational database server to process the relational database statement in question.

According to one aspect of the invention, the multidimensional database server places the extracted multidimensional data in a relational structure, referred to herein as the "virtual return table", to enable the relational database server to access and manipulate the data as if the data resided in a relational table. In one embodiment, information about how to structure a virtual table associated with results from a table function is included in the relational database statement, and communicated from the relational database server to the multidimensional database server. In addition, the multidimensional database server may dynamically generates definitions of the types within the virtual return table, and communicates the definitions to the relational database server to enable the relational database server to access the multidimensional data within the virtual return table.

Analytic Workspaces

As mentioned above, the techniques described herein allow multidimensional data to be accessed in a relational database statement. The multidimensional data is structured according to a multidimensional schema. According to one embodiment, the multidimensional schema makes use of analytic workspaces.

An analytic workspace is a storage type that provides multidimensional structures that are compatible with multidimensional database objects such as dimensions, variables, formulas, relations, and valuesets. Analytic workspaces can persist across sessions and be shared by multiple user sessions. In the context of OLAP operations, an analytic workspace includes a set of data that can be manipulated according to the OLAP operations.

The techniques described herein may be used in embodiments where the multidimensional data and schema managed by the multidimensional database server resides separate from the relational data and schema managed by the relational database server. Alternatively, the multidimensional data may itself be stored within relational database structures managed by the relational database server. For example, the data underlying an analytic workspace may be stored persistently in relational database tables, as LOBs (large objects).

The techniques described herein may be implemented to manage multidimensional data stored in an analytic workspace construct, for example, data on which OLAP operations have been performed in the context of an analytic workspace and the results of which are stored persistently in relational tables. These techniques can be employed, generally, to extract multidimensional data from the relational database for presentation to a relational database server, e.g., a SQL processing engine, for further query and manipulation operations based on SQL statements.

Operating Environment

FIG. 1 is a block diagram that illustrates an operating environment in which an embodiment of the invention may be implemented.

The operating environment includes a database server 102 and a database 104. Database server ("server") 102 comprises a combination of integrated software components and an allocation of computational resources (such as memory and processes) for executing the integrated software components on one or more processors, where the combination of the software and computational resources are used to manage a particular database on behalf of clients of the server. Among other functions of database management, a database server 102 governs and facilitates access to a particular database, such as database 104, by processing requests by clients to access the database.

Database server 102 comprises a multidimensional database server 106, which is a server module that is specially built to interact with multidimensional data in a multidimensional schema, such as cube 110. Multidimensional database server 106 is able to interpret the multidimensional data which, in one embodiment, is stored as one or more LOBs or BLOBs in a database table. Based on techniques described herein, multidimensional database server 106 manages extraction of multidimensional data from database 104, for presentation to relational database server 108.

Database server 102 comprises a relational database server 108, which is a server module that parses, interprets and manages execution of queries on database 104. In one embodiment, relational database server 108 comprises a SQL processor that parses, interprets and manages execution of data queries and/or operations embodied in SQL statements. During processing of a relational statement, relational database server 108 can request and receive a set of multidimensional data, such as virtual return table 107, from multidimensional database server 106 for further processing according to one or more SQL statements. Thus, relational database server 108 can directly access and operate on data in table 112, and can access and operate on data stored in multidimensional cubes, such as multidimensional cube 110, via multidimensional database server 106. The more limited (i.e., "filtered") the multidimensional data is that is presented to relational database server 108, the less processing that is required of relational database server 108 when executing SQL statements thereon.

Database 104 is communicatively coupled to server 102 and is a repository for storing data and metadata on a persistent memory mechanism, such as a set of hard disks. Such data and metadata may be stored in database 104 logically, for example, according to relational schema constructs, multidimensional schema constructs, or a combination of relational and multidimensional schema constructs. Database 104 comprises a multidimensional schema for storing data for one or more multidimensional cubes 110, an abstract data construct that represents multidimensional data. As mentioned, data that is organized by two or more dimensions is referred to as multidimensional data.

Database 104 comprises a relational schema for storing relational database tables such as table 112. Table 112 may store relationally managed base data, as well as pre-computed aggregated data. In one embodiment, database 104 stores both multidimensional cubes 110 and relational tables 112. Hence, in such an embodiment, database 104 and database server 102 are part of a relational database management system (RDBMS) that is capable of storing, managing and manipulating relational and multidimensional data and that provides structures and access techniques specifically designed for multidimensional data.

However, embodiments are not limited to an operating environment in which both the multidimensional schema and the relational schema are integrated into a common database 104, as depicted in FIG. 1. Rather, in one embodiment, the multidimensional schema and the relational schema are associated with separate databases. In addition, embodiments are not limited to an operating environment in which both the multidimensional database server 106 and the relational database server 108 are integrated into a common database server 102, as depicted in FIG. 1. Rather, in one embodiment, the multidimensional database server 106 and the relational database server 108 are separate servers that are communicatively coupled with each other.

Managing Multidimensional Data in a Relational Database Management System

Figure 2A:
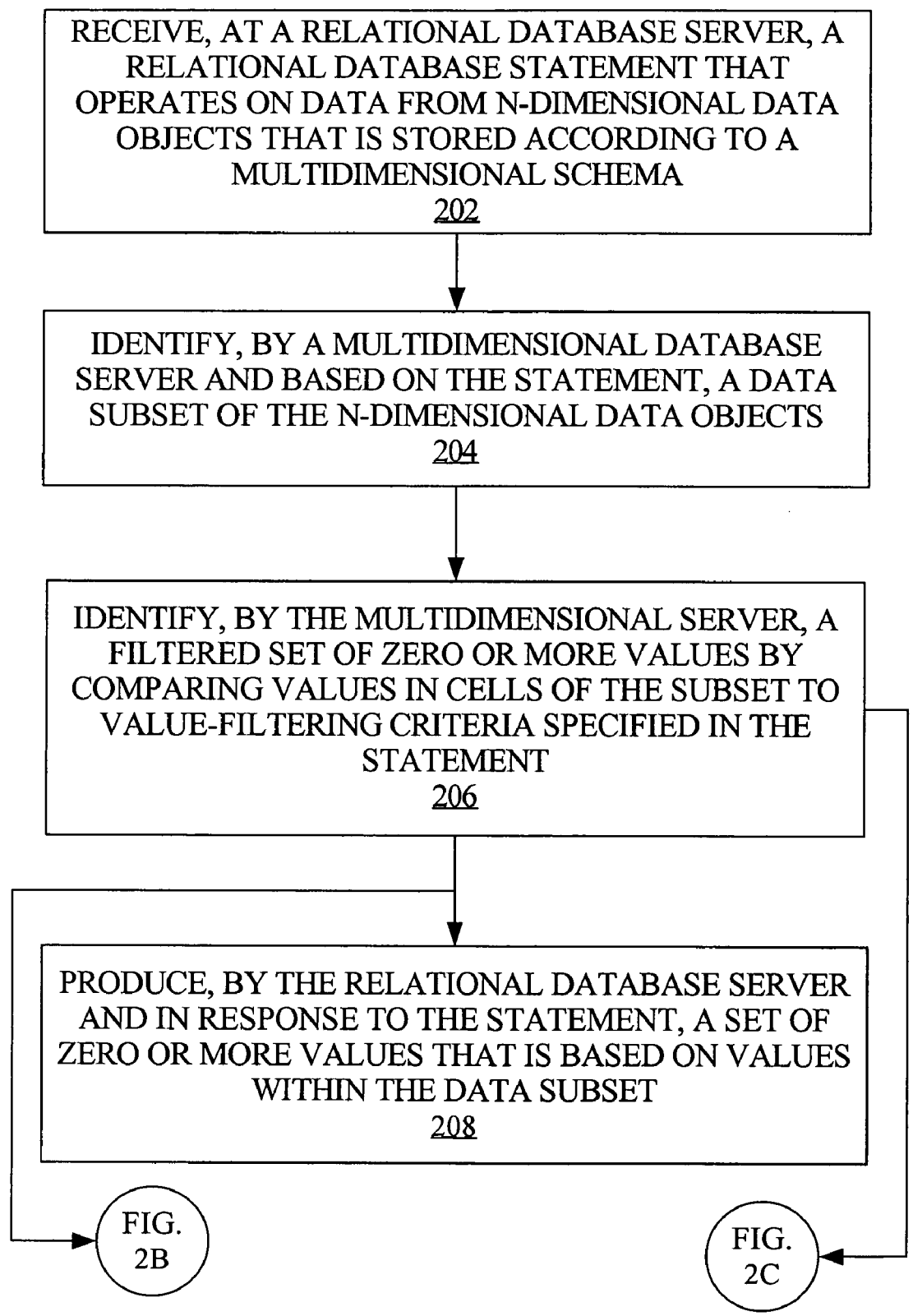
FIG. 2A is a flow diagram that illustrates a method in which multidimensional data is efficiently managed in a relational database system, according to an embodiment of the invention.

FIG. 2A is a flow diagram that illustrates a method in which multidimensional data is efficiently managed in a relational database system, according to an embodiment of the invention. For example, multidimensional data is efficiently fetched by a multidimensional database server 106 for presentation to a relational database server 108, as a minimized set of data, so that the relational database server can query and/or manipulate the set of data using SQL statements.

Multidimensional Schema

SQL-based applications can request access to multidimensional data from n-dimensional data objects stored in analytic workspaces. In an object-relational database system, two mechanisms in the database's construction make such access possible: object types and table functions.

An object type encapsulates a data structure along with the functions and procedures needed to manipulate the data contained therein. The individual elements of the data structure are referred to as properties. With multidimensional data, the "real-world objects" that correspond to the properties of an object type are measures, dimensions, hierarchies, attributes, and the like. By defining object types for groupings of objects in an analytic workspace, and then defining virtual return tables of these objects, the format of multidimensional data is described as rows and columns to a relational database server 108 (FIG. 1), e.g., to a SQL processor of a relational database server.

Requesting Multidimensional Data Using Relational Statement Table Function

One way to request multidimensional data from n-dimensional data objects that is stored according to a multidimensional schema is to use a table function. Table functions produce a collection of rows that can be queried like a database table. For example, a table function is used instead of a database table name in the FROM clause of a SQL query. Table functions can be used to fetch data from objects in an analytic workspace. If table functions are used in conjunction with relational views, the multidimensional source of the data is transparent to SQL-based applications, which can then use standard SQL statements to run against the views of the multidimensional data just as applications access other relational tables and views in the relational schema.

At block 202, a relational database statement is received that operates on data from n-dimensional data objects that is stored according to a multidimensional schema. One example of a relational database statement that is received at block 202 is a SQL statement that includes a table function in a SELECT clause, to query multidimensional data stored in an analytic workspace. Although the broad techniques described herein apply to any type of relational database statement, hereafter the description will refer to such a statement simply as a query. A view of an analytic workspace is like any other relational view, in being a saved relational query. However, a table function (e.g., OLAP_TABLE, in one implementation) takes the place of a relational table in the SELECT clause of the query, as shown in the following example syntax.

---

CREATE OR REPLACE VIEW view_name AS
SELECT columns
  FROM TABLE(OLAP_TABLE(parameters))
  WHERE conditions.

---

The columns are the names of property columns in the virtual return table that was defined for population by the table function, in this example, the OLAP_TABLE function. The specified columns of the virtual return table include those columns that are specified as targets in a parameter of the table function. The conditions modify the result set from the table function. The conditions are processed by either the multidimensional database server 106 or the relational database server 108, depending on the associated operators.

In one embodiment, a query is received at block 202 that includes a table function that extracts multidimensional data from a multidimensional schema construct, such as an analytic workspace, and presents the data in a relational format, such as a two-dimensional table format. The data associated with the analytic workspace may be stored persistently or calculated "on-the-fly" from persistently stored data. The result set from the table function is a virtual return table containing columns that can be joined to relational tables or views, or to other virtual return tables populated by another table function. One example of such a table function is the OLAP_TABLE function referenced herein, which is described in Chapter 12 ("OLAP_TABLE") of "Oracle 9i User's Guide, Release 2 (9.2.0.2)", Part No. A95295-02, from Oracle Corporation, which is incorporated by reference in its entirety for all purposes as if fully set forth herein. However, any function that operates to extract multidimensional data for presentation in a relational format may be used in implementations of the broad techniques enabled herein.

Extracting the Required Multidimensional Data

At block 204, a subset of data is identified based on the query. For example, the multidimensional database server 106 (FIG. 1) identifies source data, i.e., a subset of data (e.g., a cube) from the n-dimensional data (e.g., n-dimensional analytical workspace data objects), based on a table function. The table function may operate with one or more input parameters that specify (1) the name of the analytic workspace in which the source data (also referred to as data objects and data items) is stored; (2) the name of a virtual relational table that has been defined to organize the multidimensional data in tabular form; and (3) a mapping of the source data objects to target columns in the table. Therefore, from these parameters the multidimensional database server identifies a subset of the multidimensional data, i.e., a subset of the n-dimensional data objects, prior to fetching the source data from the analytic workspace. For example, the subset may be identified based on the specification of dimension a, dimension b, and dimension c in the limit map.

In one embodiment, based on the statement, the multidimensional database server 106 also identifies a relational form in which the subset of data should be organized, as described herein.

In one embodiment, the table function has another input parameter that specifies a command, such as an OLAP DML (Data Manipulation Language) command, that may be used, for example, to limit one or more dimensions to a particular level of the dimension's hierarchical structure.

Each measure of a cube of an n-dimensional data set (e.g., analytic workspace) has only one value per cell. However, each cube of an n-dimensional data set may contain a value for more than one measure, i.e., multiple cells. For example, a cube that is keyed by a particular product, particular region, and particular time period, may contain measure values for number of units sold, dollar amount of sales, cost to sell the units sold, number of returns, and the like. Hence, a cube of an n-dimensional data set may contain an array of measure values, rather than just a single value.

At block 206, a filtered set of one or more values is generated, generally, by comparing certain values in certain cells of the data subset to value-filtering criteria specified in the query. The filtering performed at block 206 may comprise multiple filtering operations based on respective filtering criteria specified in the query, e.g., specified in various SQL query clauses. Block 206 is optional because a multidimensional database server might simply return a virtual return table, to the relational database server, that is based merely on the dimensions specified in the table function, without performing further filtering operations on the requested subset. If block 206 is not performed by the multidimensional database server, then more processing would be required by the relational database server than if block 206 is performed by the multidimensional database server.

Figures 2A, 2B:
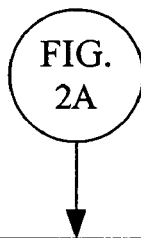
FIG. 2B is a flow diagram that illustrates steps that may be performed that are related to presenting a filtered subset of data, according to an embodiment of the invention.
Figure 2C:
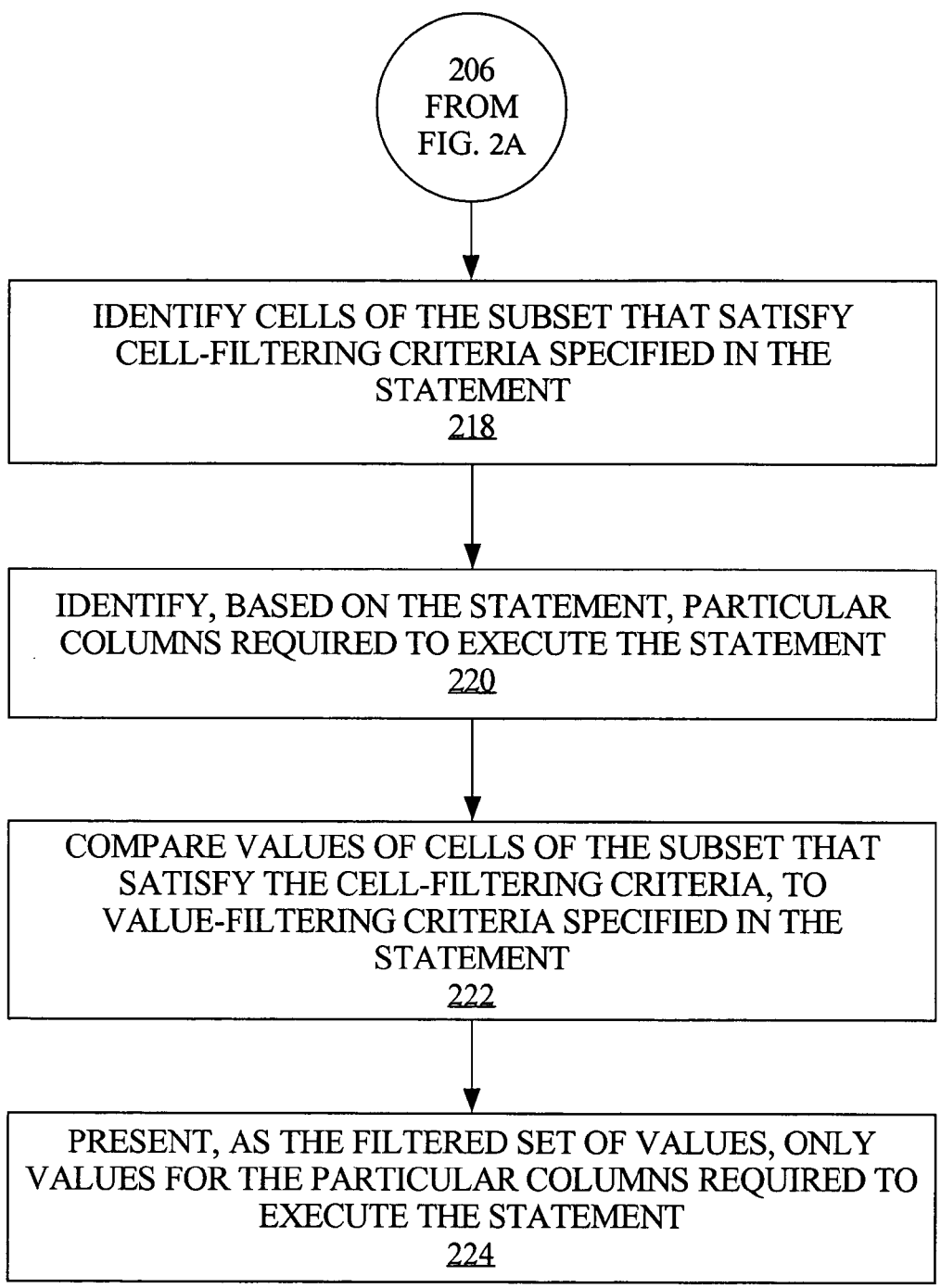
FIG. 2C is a flow diagram that illustrates steps that may be performed that are related to identifying the filtered subset of data, according to an embodiment of the invention.

FIG. 2C is a flow diagram that illustrates steps that may be performed that are related to identifying the filtered subset of data at block 206, according to embodiments of the invention. The actions depicted in FIG. 2C are optional with respect to the broad teachings herein, and are not limited to performance in the order illustrated.

Cell-Filtering Based on Query

During cell filtering, the multidimensional database server may determine which cells in the subset satisfy any cell-filtering criteria specified in the query. For example, the multidimensional database server may further analyze and operate in response to the query based on dimension-based criteria and/or measure-based criteria contained in clauses of the query. Implementations may use dimension-based cell filtering, measure-based cell filtering, or both dimension-based and measure-based cell filtering in order to identify a subset of cell that should be further processed by the multidimensional database server.

Dimension-Based Cell-Filtering Criteria

In one embodiment, at block 218 a subset of cells (e.g., a sub-cube) is identified, from the data subset (i.e., the cube), having cells that satisfy dimension-based cell-filtering criteria specified in the query. For example, based on information in the table function parameters (e.g., a LIMIT statement) or in a SQL WHERE clause, particular cells within the subset that are of interest to the query are identified based on dimension-based criteria. Thus, even though a subset of the n-dimensional objects has already been identified based on the table function, other portions of the database query might further limit the particular cells of interest within the subset.

For example, the subset may simply consist of the cells identified by the complete ranges of each of multiple dimensions, such as all the products in all the geographic regions for all the time periods. However, limiting criteria in the query can be used to further filter the data that is extracted from the analytic workspace. For example, criteria may specify that the query be limited to a particular range of products in a particular range of geographic regions for a particular time period. The multidimensional database server 106 can use such criteria to filter the subset to identify particular cells of interest to the query. In this scenario, the particular cells form a sub-cube since the identified cells are based on contiguous ranges of dimensions.

Furthermore, criteria may specify that the query be limited to one or more unique combinations of dimensional keys, such as a particular product in a particular geographic region for a particular time period. The multidimensional database server 106 can use such criteria to filter the subset to identify particular cells of interest to the query. In this scenario, the particular cells may not form a sub-cube of the subset, rather the cells might be scattered throughout the subset based on the specific key combinations that each comprises a particular key for each of a plurality of dimensions of the n-dimensional data objects.

Measure-Based Cell and Cell Value-Filtering Criteria

In one embodiment, at block 218 a subset of cells is identified, from the data subset, having cells that satisfy measure-based cell-filtering criteria specified in the query. For example, based on information in a SQL WHERE clause, particular cells within the subset that are of interest to the query are identified based on measure-based criteria.

For example, a query clause that specifies "WHERE sales >$1000" is used to filter the cells from the subset. Hence, cells containing a value for the sales measure that is not greater than $1000 are filtered out of the subset, and only cells that contain a value for the sales measure that is greater than $1000 are selected and included in the subset of cells. The measures on which the measure-based cell filtering is based may be different measures than the measures on which the value filtering is based, as described hereafter.

Whether the cells of interest to the query are all of the cells in the subset or a subset of cells in the subset, in one embodiment, each cell of the subset is looped through for a value comparison process, i.e., to compare cell values with value-filtering criteria. In the embodiment in which a subset of particular cells has been identified, at block 222 only values in the particular cells are compared to the value-filtering criteria specified in the query.

Column Filtering Based on Query

In one embodiment, at block 220, a technique referred to as "projected column filtering" is used, in which particular columns that are of interest to the query are identified, e.g., columns that are required to completely execute the query. For example, columns that are needed by the query, e.g., columns from a SELECT or WHERE clause, are identified and only those columns are pushed through the table function. If an unused column is a measure, then the column is not queried and a "null" is placed into an internal row buffer. If an unused column is a dimension, then the column is still "visited" because dimension columns result in rows in the result set. However, the values in the dimension column are not placed in the row buffer. Examples of projected column filtering follow.

With a table with dimensions a, b, c and measure d, consider the following query.

SELECT a, b FROM TABLE(OLAP_TABLE( )) WHERE c=5

The measure column, d, is not queried and nulls are placed in the row buffer for that column. The user only sees values from columns a and b and does not see values from columns c or d. However, the relational server requires values from the c column to fulfill the query. Therefore, values for the c column are included in the row buffer for use by the relational server.

With the same table, consider the following query.

SELECT a FROM TABLE(OLAP_TABLE( )) WHERE c=5

The user only sees values for column a, but the relational server requires values from column c to fulfill the query. Therefore, values for column c are included in the row buffer for use by the relational server, and columns b and d are ignored, i.e., nulls are placed in the row buffer for those columns. However, the values of column b are still looped over because dimension columns have an affect on the number of rows.

In this embodiment, at block 224, only values for the particular identified columns are presented as the filtered set of data values, thereby limiting the amount of data sent to the relational database server. Therefore, despite elements of the query statement (e.g., table function parameters) requesting certain data, if the remainder of the query limits the requested or required data to values from particular columns, then the multidimensional database server 106 (FIG. 1) only returns, to the relational database server, values from the required columns.

Measure Filtering Based on Query

As mentioned, each cube of an n-dimensional data set may contain more than one measure value. In addition to identifying the cubes of interest, the multidimensional database server also determines which measures from those cubes should be returned to the relational database server.

In one embodiment, particular measures that are of interest to the query are identified, e.g., measures that are required to completely execute the query. The particular measures are identified based on the query, and include those measures that correspond to columns specified in the SQL SELECT clause. In addition, the particular measures that are required by the relational database server in order to execute the query may include measures that are not specified in the SQL SELECT clause. For example, the query may include a SQL JOIN clause that specifies a join of the virtual return table with another table based on a particular measure column. Therefore, even though the SELECT clause of the query may request that values from one measure column are returned in the virtual return table, values from the particular measure column are required by the relational database server in order to execute the query completely, namely, in order to perform the table join operation.

Providing the Data to the Relational Database Server

For the relational database server to use the data returned by the multidimensional database server, the data must be presented in a structure that the relational database server can understand. FIG. 2B is a flow diagram that illustrates steps that may be performed that are related to presenting to the relational database server a filtered subset of data from the multidimensional schema, according to embodiments of the invention. For example, the multidimensional database server 106 may perform the actions depicted in FIG. 2B, in presenting data fetched from multidimensional cube 110 to relational database server 108 (FIG. 1). The actions depicted in FIG. 2B are optional with respect to the broad teachings herein, and are not limited to performance in the order illustrated.

At block 210, the multidimensional database server 106 (FIG. 1) determines, based on the query, a particular relational form in which to present values from the subset. As discussed, the table function may operate with an input parameter that specifies a particular "form" in which multidimensional data from the multidimensional schema is to be presented to the relational server according to the table function, by which row buffers are populated and presented to the relational server so that the relational server can see the multidimensional data as if it were a table. In one embodiment, an abstract table type can be defined in the relational database server to describe the virtual return table that is populated by the table function, which describes the "shape" of the result of the table function, e.g., essentially a mapping of source multidimensional data objects to target "rows" (e.g., abstract object types) and "columns" (e.g., attributes of the abstract object types) in the virtual return table (e.g., abstract table type as a collection of abstract object types). Therefore, in one embodiment, the multidimensional database server determines the particular relational form based on the parameters of the table function included in the query.

Because the specified format in which the data is to be presented is known to the multidimensional database server 106 (FIG. 1), the server 106 can structure the set of values while extracting the data from the multidimensional schema, such as multidimensional cube 110 (FIG. 1). Hence, the data can be presented to the relational database server 108 (FIG. 1) at block 214, in a form that server 108 can readily use, e.g., can readily query and/or manipulate.

Dynamic Creation of Abstract Data Type Definitions

As discussed, a table function might have parameters that specify a mapping of source multidimensional data to a target virtual return table 107. However, as previously described, the table function does not completely govern what is returned to the relational database server 108 for complete execution of the query. Hence, relational database server 108 (FIG. 1) may be requesting data for an application without knowing what data types and in what format the actual returned values will be. Therefore, at block 212, the multidimensional database server 106 (FIG. 1) dynamically creates abstract data type definitions if necessary to define the data values contained in the virtual return table 107, which were not previously defined and specified in the table function. For example, each abstract data type definition may define data in a particular column of the row buffer.

The abstract data type definitions are dynamically created as part of the process of fetching and organizing the multidimensional data that is requested in the query, based on the nature of the data returned in response to the query. Furthermore, the abstract data type definitions are returned to the relational database server 108 so that the server 108 can understand and work with the data that is presented in the virtual return table 107 at block 214.

Returning to FIG. 2A, at block 208, in response to the query the relational database server produces a set of zero or more values that is based on values within the data subset, i.e., values within the virtual return table 107. Hence, the relational database server 108 (FIG. 1) can perform further processing on the data presented to the relational database server by the multidimensional database server 106 (e.g., at block 214 or block 224), according to the original query received at block 202 or according to additional queries, such as a query on a materialized view.

Hardware Overview

Figure 3:
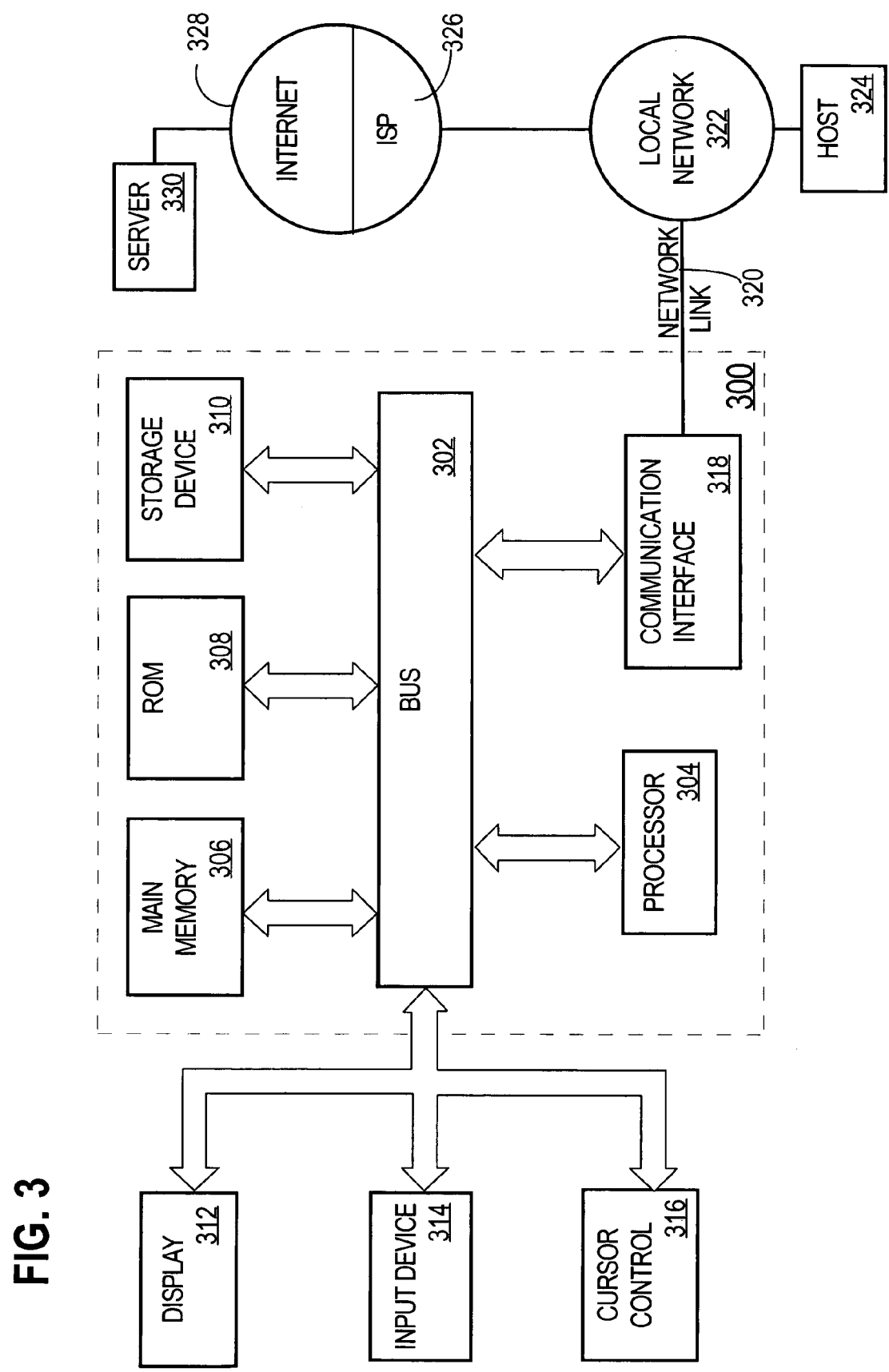
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304.

Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising the computer-implemented steps of:

receiving, at a relational database server, a relational database statement that specifies one or more relational operations to perform on a data subset of one or more n-dimensional data objects that are stored according to a multidimensional schema;

passing, from said relational database server to a multidimensional database server, a) a function that identifies the data subset based on information that is contained in said relational database statement and, b) separate from the function, one or more value-filtering criteria involved in the one or more relational operations;

identifying, by the multidimensional database server and based on said function, the data subset of said n-dimensional data objects;

generating, by said multidimensional database server, a filtered set of one or more values from the data subset based on the one or more value-filtering criteria;

passing, from said multidimensional database server to said relational database server, said filtered set of one or more values;

performing, at the relational database server, the one or more specified relational operations on the filtered set of one or more values returned to the relational database server; and producing and returning, by said relational database server and in response to said relational database statement, results of the one or more relational operations;

wherein the method is performed by one or more computing devices.

2. The method of claim 1, further comprising the computer-implemented steps of:
extracting, by said multidimensional database server, values within said data subset; and
the multidimensional database server passing said filtered set of one or more values from said data subset to the relational database server in a particular relational form.

3. The method of claim 2, further comprising the computer-implemented steps of:
determining, by said multidimensional database server, said particular relational form.

4. The method of claim 2, further comprising the computer-implemented steps of:
determining, by said multidimensional database server, said particular relational form based on information contained in said relational database statement.

5. The method of claim 2, wherein the step of passing the filtered set of one or more values from the data subset comprises passing said filtered set of one or more values in a form of a relational database table.

6. The method of claim 2, wherein said relational database statement is a SQL statement, and wherein the step of passing the filtered set of one or more values from the data subset comprises passing said filtered set of one or more values in said particular relational form to a SQL processor of said relational database server.

7. The method of claim 2, further comprising the computer-implemented step of:
dynamically generating one or more abstract data type definitions that define formats of at least a portion of said values from said subset.

8. The method of claim 7, further comprising the computer-implemented step of:
the multidimensional database server communicating the dynamically generated abstract data type definitions to the relational database server; and
the relational database server accessing data in the filtered set of one or more values based on the abstract data type definitions.

9. The method of claim 2, wherein the step of passing said filtered set of one or more values in a particular relational form comprises passing said filtered set of one or more values in a form of a relational database table in which a particular column is associated with one or more particular measure values, the method further comprising the computer-implemented step of:
the multidimensional database server dynamically creating an abstract data type definition that defines a format of said values in said column.

10. The method of claim 1, wherein the step of identifying said data subset comprises identifying all cells associated with a respective range of keys for each of a plurality of dimensions of said n-dimensional data objects.

11. The method of claim 1, wherein the data subset consists of non-contiguous cells, and wherein the step of identifying a data subset comprises identifying only cells associated with one or more user-specified key combinations that each comprises a particular key for each of a plurality of dimensions of said n-dimensional data objects.

12. The method of claim 1, further comprising the computer-implemented step of:
generating, by said multidimensional database server, the filtered set of one or more values by comparing values in cells of said data subset to the value-filtering criteria.

13. The method of claim 12, wherein the step of generating said filtered set of one or more values comprises:
looping through each cell associated with a respective range of keys for each of a plurality of dimensions of said n-dimensional data objects; and
comparing a measure value associated with each respective cell to a corresponding measure value specified in a condition in said relational database statement.

14. The method of claim 12, wherein the step of generating said filtered set of one or more values comprises:
identifying cells of said data subset that satisfy cell-filtering criteria specified in said relational database statement;
comparing values, to said value-filtering criteria, only from cells of said data subset that satisfy said cell-filtering criteria.

15. The method of claim 12, wherein the step of generating said filtered set of one or more values comprises:
identifying, based on said relational database statement, all measures that are required by the relational database server to execute said relational database statement; and
presenting, as at least a portion of said filtered set of one or more values, measure values for said measures that are required by the relational database server to execute said relational database statement.

16. The method of claim 15, wherein the step of presenting comprises presenting only measure values for said measures that are required by the relational database server to execute said relational database statement.

17. The method of claim 15, wherein the step of generating said filtered set of one or more values comprises:
comparing, to said value-filtering criteria, only values for said measures that are required by the relational database server to execute said relational database statement.

18. The method of claim 12, wherein the step of generating said filtered set of one or more values comprises:
identifying, based on said relational database statement, all dimensions from which associated values are required by the relational database server to execute said relational database statement; and
presenting, as at least a portion of said filtered set of one or more values, values associated with said dimensions from which associated values are required by the relational database server to execute said relational database statement.

19. The method of claim 18, wherein the step of presenting comprises presenting only values associated with said dimensions from which associated values are required by the relational database server to execute said relational database statement.

20. The method of claim 1, wherein the step of receiving the relational database statement comprises receiving a SQL statement.

21. The method of claim 1, wherein said function is a table function that was specified in the relational database statement.

22. The method of claim 1, wherein the one or more value-filtering criteria include one or more of: a JOIN clause, a SELECT clause, or a WHERE clause.

23. A system comprising:
one or more processors;
memory communicatively coupled to said one or more processors;
wherein said memory stores instructions which, when executed by said one or more processors, cause performance of:
  receiving, at a relational database server, a relational database statement that specifies one or more relational operations to perform on a data subset of one or more n-dimensional data objects that are stored according to a multidimensional schema;
  passing, from said relational database server to a multidimensional database server, a) a function that identifies the data subset based on information that is contained in said relational database statement and, b) separate from the function, one or more value-filtering criteria involved in the one or more relational operations;
  identifying, by the multidimensional database server and based on said function, the data subset of said n-dimensional data objects;
  generating, by said multidimensional database server, a filtered set of one or more values from the data subset based on the one or more value-filtering criteria;
  passing, from said multidimensional database server to said relational database server, said filtered set of one or more values;
  performing, at the relational database server, the one or more specified relational operations on the filtered set of one or more values returned to the relational database server; and
  producing and returning, by said relational database server and in response to said relational database statement, results of the one or more relational operations.

24. One or more non-transitory computer-readable media storing instructions which, when executed by one or more computing devices cause:
  receiving, at a relational database server, a relational database statement that specifies one or more relational operations to perform on a data, from subset of one or more n-dimensional data objects, that is are stored according to a multidimensional schema;
  passing, from said relational database server to a multidimensional database server, a) a function that identifies the data subset based on information that is contained in said relational database statement and, b) separate from the function, one or more value-filtering criteria involved in the one or more relational operations;
  identifying, by the multidimensional database server and based on said function, the data subset of said n-dimensional data objects;
  generating, by said multidimensional database server, a filtered set of one or more values from the data subset based on the one or more value-filtering criteria;
  passing, from said multidimensional database server to said relational database server, said filtered set of one or more values;
  performing, at the relational database server, the one or more specified relational operations on the filtered set of one or more values returned to the relational database server; and
  producing and returning, by said relational database server and in response to said relational database statement, results of the one or more relational operations.

25. The one or more non-transitory computer readable media of claim 24, wherein the step of identifying said data subset comprises identifying all cells associated with a respective range of keys for each of a plurality of dimensions of said n-dimensional data objects.

26. The one or more non-transitory computer readable media of claim 24, wherein the data subset consists of non-contiguous cells, and wherein a data subset comprises identifying only cells associated with one or more user-specified key combinations that each comprises a particular key for each of a plurality of dimensions of said n-dimensional data objects.

27. The one or more non-transitory computer readable media of claim 24, wherein receiving the relational database statement comprises receiving a SQL statement.

28. The one or more non-transitory computer readable media of claim 24, wherein said function is a table function that was specified in the relational database statement.

29. The one or more non-transitory computer readable storage media of claim 24, wherein the one or more value-filtering criteria include one or more of: a JOIN clause, a SELECT clause, or a WHERE clause.

30. The one or more non-transitory computer readable storage media of claim 24, wherein the instructions, when executed by the one or more computing devices, cause performance of:
  extracting, by said multidimensional database server, values within said data subset; and
  the multidimensional database server passing said filtered set of one or more values from said data subset to the relational database server in a particular relational form.

31. The one or more non-transitory computer readable media of claim 30, wherein the instructions, when executed by the one or more computing devices, further cause:
  determining, by said multidimensional database server, said particular relational form.

32. The one or more non-transitory computer readable media of claim 30, wherein the instructions, when executed by the one or more computing devices, further cause:
  determining, by said multidimensional database server, said particular relational form.

33. The one or more non-transitory computer readable media of claim 30, wherein the instructions, when executed by the one or more computing devices, further cause:
  determining, by said multidimensional database server, said particular relational form based on information contained in said relational database statement.

34. The one or more non-transitory computer readable media of claim 30, wherein passing the filtered set of one or more values from the data subset comprises passing said filtered set of one or more values in a form of a relational database table.

35. The one or more non-transitory computer readable media of claim 30, wherein said relational database statement is a SQL statement, and wherein filtered set of one or more values from the data subset comprises passing said filtered set of one or more values in said particular relational form to a SQL processor of said relational database server.

36. The one or more non-transitory computer readable media of claim 30, wherein the instructions, when executed by the one or more computing devices, further cause:
dynamically generating one or more abstract data type definitions that define formats of at least a portion of said values from said subset.

37. The one or more non-transitory computer readable media claim 36, wherein the instructions, when executed by the one or more computing devices, further cause:
the multidimensional database server communicating the dynamically generated abstract data type definitions to the relational database server, and
the relational database server accessing data in the data filtered set of one or more values based on the abstract data type definitions.

38. The one or more non-transitory computer readable media of claim 30, wherein passing said filtered set of one or more values in a particular relational form comprises passing said filtered set of one or more values in a form of a relational database table in which a particular column is associated with one or more particular measure values, wherein the instructions, when executed by the one or more computing devices further cause:
the multidimensional database server dynamically creating an abstract data type definition that defines a format of said values in said column.

39. The one or more non-transitory computer readable media of claim 24, wherein the instructions, when executed by the one or more computing devices, further cause:
generating, by said multidimensional database server, the filtered set of one or more values by comparing values in cells of said data subset to the value-filtering criteria.

40. The one or more non-transitory computer readable media of claim 39, wherein generating said filtered set of one or more values comprises:
looping through each cell associated with a respective range of keys for each of a plurality of dimensions of said n-dimensional data objects; and
comparing a measure value associated with each respective cell to a corresponding measure value specified in a condition in said relational database statement.

41. The one or more non-transitory computer readable media of claim 39, wherein generating said filtered set of one or more values comprises:
identifying cells of said data subset that satisfy cell-filtering criteria specified in said relational database statement;
comparing values, to said value-filtering criteria, only from cells of said data subset that satisfy said cell-filtering criteria.

42. The one or more non-transitory computer readable media of claim 39, wherein generating said filtered set of one or more values comprises:
identifying, based on said relational database statement, all measures that are required by the relational database server to execute said relational database statement; and
presenting, as at least a portion of said filtered set of one or more values, measure values for said measures that are required by the relational database server to execute said relational database statement.

43. The one or more non-transitory computer readable media of claim 42, wherein presenting comprises presenting only measure values for said measures that are required by the relational database server to execute said relational database statement.

44. The one or more non-transitory computer readable media of claim 42, wherein generating said filtered set of one or more values comprises:
comparing, to said value-filtering criteria, only values for said measures that are required by the relational database server to execute said relational database statement.

45. The one or more non-transitory computer readable media of claim 39, wherein generating said filtered set of one or more values comprises:
identifying, based on said relational database statement, all dimensions from which associated values are required by the relational database server to execute said relational database statement; and
presenting, as at least a portion of said filtered set of one or more values, values associated with said dimensions from which associated values are required by the relational database server to execute said relational database statement.

46. The one or more non-transitory computer readable media of claim 45, wherein presenting comprises presenting only values associated with said dimensions from which associated values are required by the relational database server to execute said relational database statement.

* * * * *

UNITED STATES PATENT AND TRADEMARK OFFICE
CERTIFICATE OF CORRECTION

PATENT NO. : 8,200,612 B2  Page 1 of 1
APPLICATION NO. : 10/841941
DATED : June 12, 2012
INVENTOR(S) : Soylemez et al.

It is certified that error appears in the above-identified patent and that said Letters Patent is hereby corrected as shown below:

In column 15, line 60, in Claim 24, after "that" delete "is".

In column 16, line 25, in Claim 26, after "wherein" insert -- identifying --.

In column 17, line 5, in Claim 35, after "wherein" insert -- passing the --.

In column 17, line 16, in Claim 37, after "media" insert -- of --.

In column 17, line 30, in Claim 38, after "devices" insert -- , --.

Signed and Sealed this
Eighth Day of January, 2013

David J. Kappos
*Director of the United States Patent and Trademark Office*